United States Patent [19]
Ishii et al.

[11] Patent Number: 5,924,955
[45] Date of Patent: Jul. 20, 1999

[54] CONTINUOUSLY VARIABLE TRANSMISSION CONTROLLER

[75] Inventors: Shigeru Ishii, Atsugi; Yoshihide Shinso; Tateki Jozaki, both of Zama, all of Japan

[73] Assignee: Nissan Motor Co., Ltd., Yokohama City, Japan

[21] Appl. No.: 08/796,590

[22] Filed: Feb. 6, 1997

[30] Foreign Application Priority Data

Feb. 8, 1996 [JP] Japan .................................... 8-022374

[51] Int. Cl.⁶ .................................................. F16H 9/00
[52] U.S. Cl. ............................................................ 477/48
[58] Field of Search ......................... 701/52; 477/46, 477/48

[56] References Cited

U.S. PATENT DOCUMENTS

| | | | |
|---|---|---|---|
| 5,249,482 | 10/1993 | Okahara et al. | 477/48 |
| 5,527,232 | 6/1996 | Seidel et al. | 477/46 |
| 5,609,544 | 3/1997 | Lardy et al. | 477/46 |
| 5,624,348 | 4/1997 | Lardy et al. | 477/46 |
| 5,642,644 | 7/1997 | Lardy et al. | 477/48 |
| 5,655,991 | 8/1997 | Lardy et al. | 477/48 |

FOREIGN PATENT DOCUMENTS

| | | |
|---|---|---|
| 61-105353 | 5/1986 | Japan . |
| 8-178055 | 7/1996 | Japan . |

*Primary Examiner*—Dirk Wright
*Attorney, Agent, or Firm*—Foley & Lardner

[57] ABSTRACT

In a controller which controls a speed change ratio of a continuously variable transmission to a target speed change ratio set based on the driving conditions of an automobile, the driver manually inputs a command which increases or decreases the speed change ratio. The controller increases or decreases the target speed change ratio by a predetermined amount according to this command. Preferably, this increase/decrease pattern is varied according to the time for which the command continues. The driver of the automobile can thereby achieve a desired speed change ratio by a simple operation.

13 Claims, 4 Drawing Sheets

CONTINUOUSLY VARIABLE TRANSMISSION CONTROLLER

FIELD OF THE INVENTION

This invention relates to speed change control in a continuously variable transmission for a vehicle.

BACKGROUND OF THE INVENTION

As a transmission system for a vehicle, a combination of a fluid transmission such as a torque converter or fluid coupling, and a continuously variable transmission which transmits the output torque of the fluid transmission to a vehicle drive shaft after changing the speed in a stepless manner, is disclosed for example in Tokkai Sho 61-105353 published by the Japanese Patent Office in 1986. This system comprises a controller which sets a target speed change ratio based on vehicle running conditions such as engine load represented by a throttle opening or vehicle travel speed, and controls the speed change ratio of the continuously variable transmission so that it coincides with the set target speed change ratio.

In addition to this automatic speed change mode referred to as D range, a manual mode known as L range is also provided wherein the driver can manually select a specific speed change ratio, e.g. a speed change ratio corresponding to the low gear of a conventional manual transmission system.

By providing this manual speed change mode, the driver can specify the low speed range when for example, the vehicle is running with a small speed change ratio in the D range, and the vehicle can therefore be driven under conditions desired by the driver which are outside the preset automatic speed change pattern. This option makes it possible to improve vehicle running performance under various non-standard running conditions.

However, in such a manual speed change mode, the number of speed change ratios that can be selected is limited. Also selection of speed change ratio in the manual mode is performed by an operation similar to using a shift lever which was difficult for a driver accustomed to the automatic speed change mode.

SUMMARY OF THE INVENTION

It is therefore an object of this invention to allow selection of any desired speed change ratio in a manual mode of a continuously variable transmission.

It is another object of this invention to make it easy to change the speed change ratio manually.

In order to achieve the above objects, this invention provides a speed change controller for an automatic transmission which changes the rotation speed of an output shaft of an automobile engine in a stepless manner. The controller comprises a mechanism for detecting a running condition of the automobile, a mechanism for setting a target speed change ratio of the transmission based on the running condition, a mechanism for controlling a speed change ratio of the transmission to the target speed change ratio, a mechanism for manually inputting a command for modifying the target speed change ratio in a direction specified therein, and a mechanism for correcting the target speed change ratio by a predetermined correction amount in the direction when the command is input.

It is preferable that the correcting mechanism comprises a mechanism for correcting the target speed change ratio at a predetermined rate in the direction when the command is continually input.

It is also preferable that the correcting mechanism comprises first mechanism for correcting the target speed change ratio by a predetermined correction amount in the direction when the command is input, and second mechanism for correcting the target speed change ratio at a predetermined rate in the direction when the command is continually input longer than a predetermined time.

It is also preferable that the target speed change ratio is set so that a rotation speed of the engine is equal to a preset target engine rotation speed.

It is also preferable that the target speed change ratio is set based on an engine load and travel speed of the automobile.

It is also preferable that the correcting mechanism comprises a mechanism for limiting the target speed change ratio after correction within a predetermined range.

It is also preferable that the correcting mechanism comprises a mechanism for limiting the target speed change ratio after correction so that a rotation speed of the engine remains within a predetermined range.

The details as well as other features and advantages of this invention are set forth in the remainder of the specification and are shown in the accompanying drawings.

DESCRIPTION OF THE PREFERRED EMBODIMENTS

Figure 1:
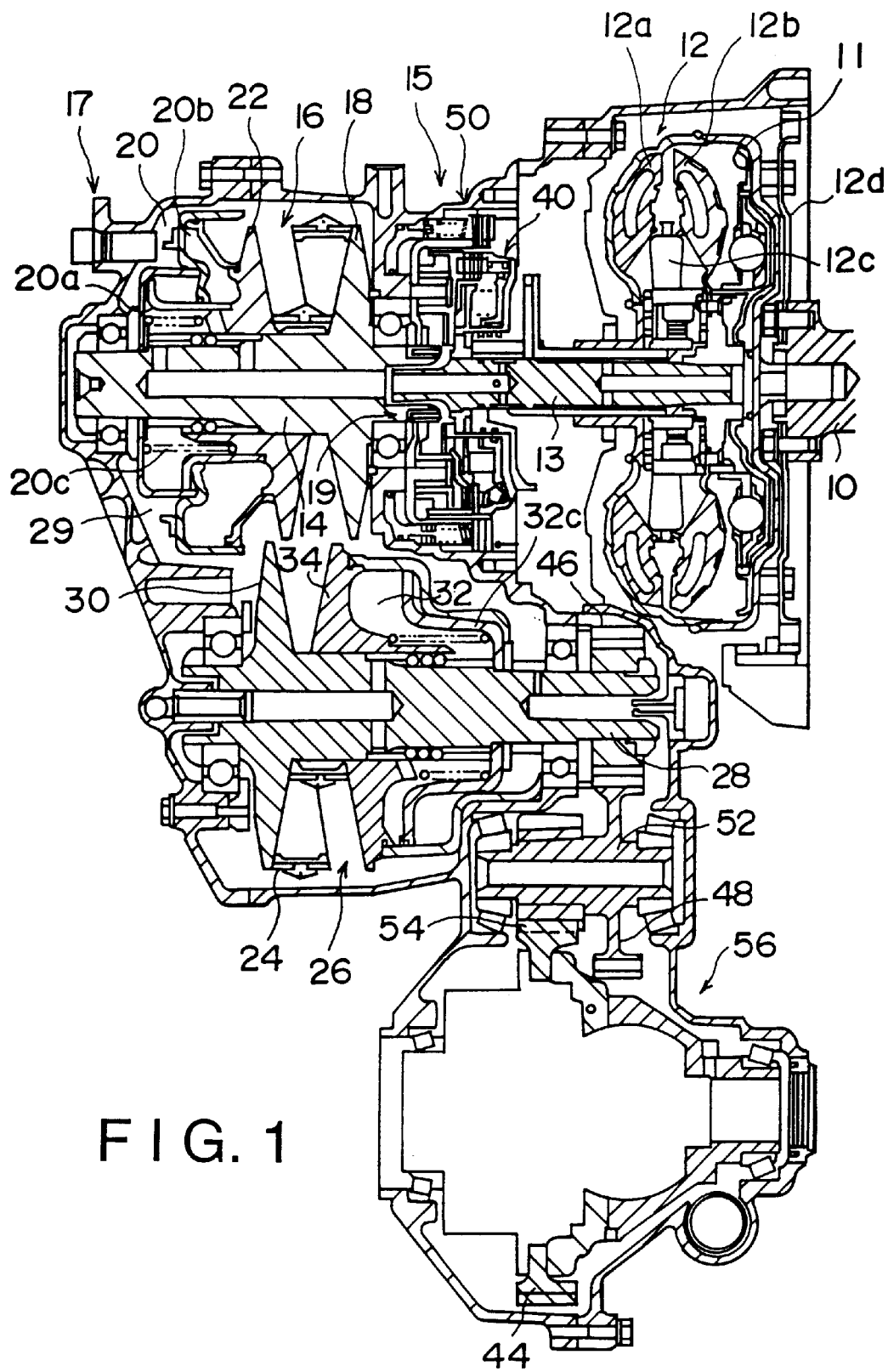
FIG. 1 is a longitudinal sectional view of a continuously variable transmission and torque converter to which this invention is applied.

Referring to FIG. 1 of the drawings, a torque converter 12 is connected to an engine output shaft 10.

The torque converter 12 comprises a lockup clutch 11. The lockup clutch 11 mechanically connects or disconnects an impeller 12a which is an input part and a turbine 12b which is an output part according to the oil pressure supplied to a converter chamber 12c and a lockup oil chamber 12d.

The turbine 12b is connected to a rotation shaft 13, the rotation shaft 13 being connected to a forward/reverse change-over mechanism 15. The mechanism 15 comprises a planetary gear mechanism 19, forward clutch 40 and reverse brake 50. The output shaft of the mechanism 19 is connected to a drive shaft 14 formed coaxially with the rotation shaft 13. The drive shaft 14 comprises the input shaft of a continuously variable transmission (CVT) 17. It should be noted that a fluid coupling or an electromagnetic clutch may be used instead of the torque converter 12.

The CVT 17 comprises a drive pulley 16 and driven pulley 26, and a V-belt 24 which transmits the rotation of the drive pulley 16 to the driven pulley 26, as described hereinabove.

The drive pulley 16 comprises a fixed conical plate 18 which rotates together with the drive shaft 14 and a movable conical plate 22 disposed relative to the fixed conical plate 18 forming a V-shaped pulley groove with the fixed conical plate 18. The movable conical plate 22 moves in the axial direction of the drive shaft 14 according to an oil pressure acting on a drive pulley cylinder chamber 20 while it rotates with the fixed conical plate 18. The drive pulley cylinder chamber 20 comprises a chamber 20a and chamber 20b. The movable conical plate 22 has a pressure receiving surface larger that of a movable conical plate 34 described hereinafter.

The driven pulley 26 is installed on a driven shaft 28. The driven pulley 26 comprises a fixed conical plate 30 which rotates together with the driven shaft 28 and a movable conical plate 34 disposed relative to the fixed conical plate 30 forming a V-shaped pulley groove with the fixed conical plate 30. The movable conical plate 34 moves in the axial direction of the driven shaft 28 according to an oil pressure acting on a driven pulley cylinder chamber 32 while it rotates with the fixed conical plated 30.

The driven pulley 28 is provided with a drive gear 46 which rotates together with the pulley 28. The drive gear 46 engages an idler gear 48 on an idler shaft 52. The idler shaft 52 comprises a pinion gear 54 which rotates together with the shaft 52. The pinion gear 54 engages a final gear 44. The final gear 44 drives a propeller shaft or drive shaft, not shown, via a differential unit 56.

The rotation input to the CVT 17 from the engine output shaft 10 is transmitted to the forward/reverse change-over mechanism 15 via the torque converter 12 and rotation shaft 13. When the forward clutch 40 is engaged and the reverse brake 50 is released, the rotation of the rotation shaft 13 is transmitted to the drive shaft 14 of the CVT 17 with the same rotation direction via the planetary gear mechanism 19 whereof the input shaft and output shaft rotate together. On the other hand, when the forward clutch 40 is released and the reverse brake 50 is engaged, the rotation of the rotation shaft 13 is transmitted to the drive shaft 14 with the opposite rotation direction due to the action of the planetary gear mechanism 19.

The rotation of the drive shaft 14 is transmitted to the differential unit 56, drive pulley 16, V-belt 24, driven pulley 26, driven shaft 28, drive gear 46, idler gear 48, idler shaft 52, pinion gear 54 and final gear 44. When the forward clutch 40 and reverse brake 50 are both released, the forward/reverse change-over mechanism 15 goes into neutral, and transmission of a rotation from the rotation shaft 13 to the drive shaft 14 does not occur.

In the aforesaid dynamic transmission, the rotation ratio, i.e. speed change ratio (deceleration ratio) between the drive pulley 16 and driven pulley 26 varies when the movable conical plate 22 of the drive pulley 16 and movable conical plate 34 of the driven pulley 26 are moved in the axial direction so as to alter the contact point radius with the V-belt 24. For example, if the width of the V-shaped pulley groove of the drive pulley 16 is enlarged and the width of the V-shaped pulley groove of the driven pulley 26 is narrowed, the contact point radius of the V-belt 24 on the side of the drive pulley 16 decreases and the contact point radius of the V-belt 24 on the side of the driven pulley 24 increases, so a large deceleration ratio is obtained. When the movable conical plates 22, 34 are moved in the opposite direction, the deceleration ratio becomes smaller.

This control of the widths of the V-shaped pulley grooves of the drive pulley 16 and driven pulley 26 is performed by controlling the relative pressures of the drive pulley cylinder chamber 20 (20a, 20b) and driven pulley cylinder chamber 32 via a control system described hereinafter.

Figure 2:
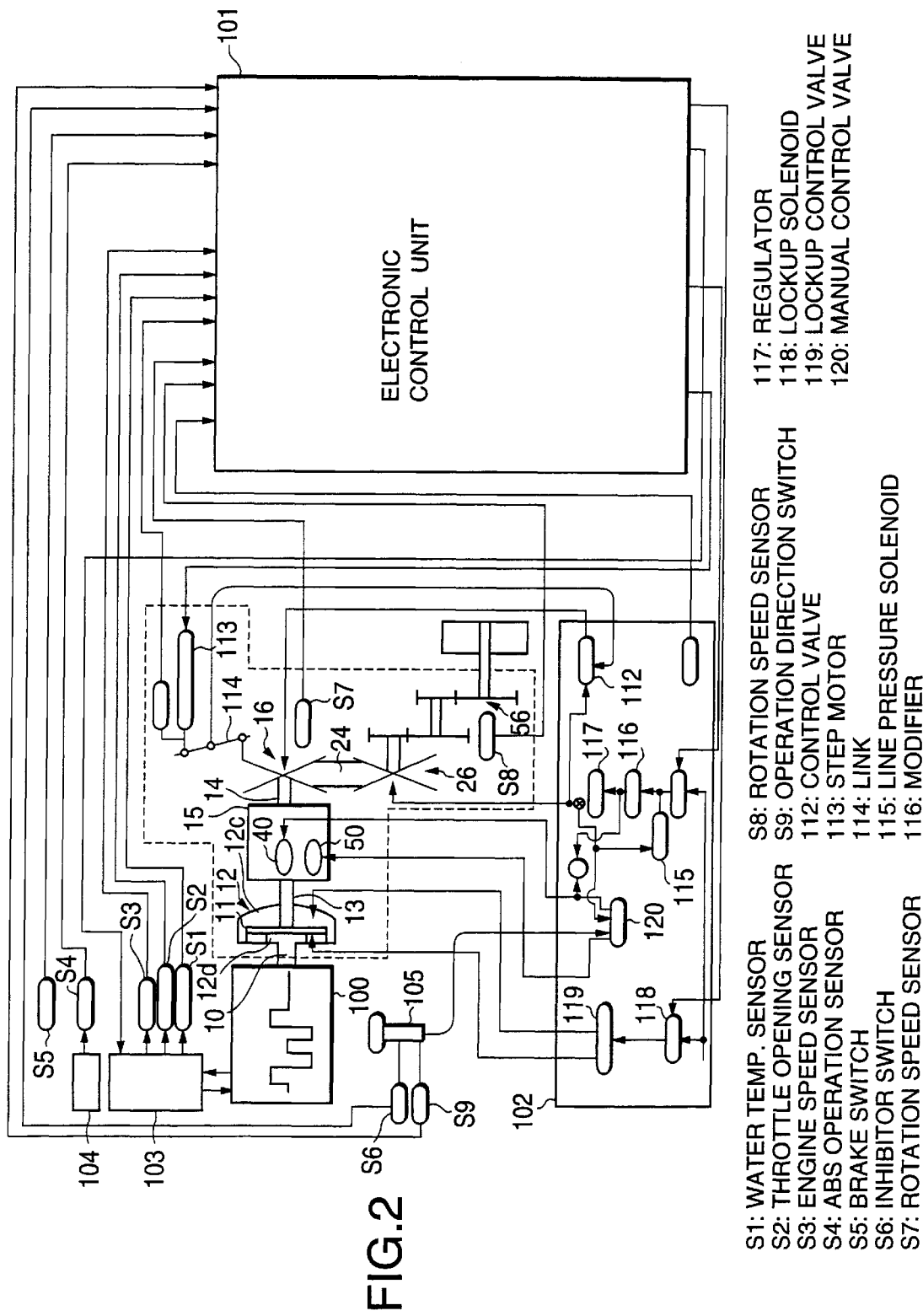
FIG. 2 is a block diagram of a controller of the continuously variable transmission according to this invention.

The rotation ratio of the CVT 17 is controlled by the control unit shown in FIG. 2. The same symbols are used as for the mechanism in FIG. 1.

In FIG. 2, 101 is an electronic control unit comprising a microprocessor, and 102 denotes a hydraulic control unit comprising various oil pressure control valves. In this control system, the main means of controlling the aforesaid CVT are the electronic control unit 101 and the hydraulic control unit 102.

The electronic control unit 101 is a microcomputer comprising a central processing unit (CPU), read-only memory (ROM), random access memory (RAM) and an I/O interface.

Signals from a water temperature sensor S1, throttle opening sensor S2, engine rotation speed sensor S3, ABS operation sensor which detects an operation of an antilock brake system (ABS) controller 104, braking sensor S5 which detects braking of the vehicle, inhibitor switch S6 showing the operating position of a selector switch 105, rotation speed sensor S7 which detects the rotation speed of the drive pulley 16, rotation speed sensor S8 which detects the rotation speed of the driven pulley 26, and an operating direction switch S9 described hereafter which detects the operating direction of a selector lever 105 in the manual operating mode, are input to the electronic control unit 101.

The electronic control unit 101 performs predetermined calculations on these signals to control the speed change ratio of the CVT 17, the line pressure and the lockup clutch 11.

Describing these functions in detail, the electronic control unit 101 outputs a drive signal to a step motor 113 so that speed change is performed according to a predetermined pattern depending on the engine load and engine rotation speed represented by the throttle opening, and the vehicle speed. The throttle opening is detected by the throttle opening sensor S2, the engine rotation speed is detected by the engine rotation speed sensor S3, and the vehicle speed is detected by the rotation speed sensor S8 which detects the rotation speed of the driven pulley 26.

The step motor 113 drives a speed change control valve 112 of a hydraulic control unit 102 so as to obtain a speed change ratio corresponding to this drive signal. The pressures of the drive pulley cylinder chamber 20 and driven pulley cylinder chamber 32 are varied relative to each other by controlling the line pressure supplied to the drive pulley cylinder chamber 20 shown in FIG. 1.

The displacement position of the drive pulley 16, i.e. the speed change ratio, is feedback controlled by the speed change control valve 112 via a link 114. After a target speed change ratio corresponding to the position of the step motor 113 is obtained, the electronic control unit 101 fixes the relative pressure of the pulley cylinder chambers 20, 32 so as to maintain the target speed change ratio. In this speed change control of the CVT 17, when the line pressure of the pulleys 16, 26 is too small, the frictional force between the pulleys 16, 18 and V belt 24 is insufficient so that slip occurs. Conversely, when the line pressure is too large, the frictional force becomes excessively large. In either case, there is an adverse effect on the fuel consumption and power performance of the vehicle. The line pressure is therefore controlled so that the power transmitted is neither excessive nor deficient according to the driving conditions.

In other words, the electronic control unit 101 controls the position of the line pressure solenoid 115 of the oil pressure control unit 102 by the control signal output. The line pressure solenoid 115 supplies oil pressure from a hydraulic pump, not shown, to the driven pulley chamber 32 after the pressure is adjusted to a suitable target line pressure via a modifier (pressure control valve) 116 and regulator (constant pressure valve) 117, and also supplies oil pressure to the drive pulley cylinder chamber 20 via the speed change control valve 112.

The lockup clutch 11 is engaged when, for example, the vehicle speed increases beyond a predetermined value, and disengaged when the vehicle speed falls to less than this predetermined value.

The electronic control unit 101 therefore outputs a signal to the lockup solenoid 118 of the oil pressure control unit 102 according to the vehicle speed, and the lockup control valve 119 is changed over accordingly. The lockup control valve 119 is a valve which changes over between a system which supplies the oil pressure of the hydraulic pump to a converter chamber 12c of the torque converter 12 as an applied pressure of the lockup clutch 11 while releasing a lockup oil chamber 12d, and a system which supplies the oil pressure of the hydraulic pump to the lockup oil chamber 12d as a release pressure while releasing the converter chamber 12c.

The oil pressure control unit 102 is further provided with a manual control valve 120 connected to a selector lever 105. The manual control valve 120 selectively supplies oil pressure obtained from the oil pressure pump via the line pressure solenoid 115, to a forward clutch 40 and a reverse brake 50 of a forward/reverse change-over mechanism 15 according to the operating position of the selector lever 105. In this way, the forward/reverse change-over mechanism 15 is changed over between the forward, reverse and neutral positions.

The above-mentioned CVT and the basic structure of its controller are disclosed in, for example, Tokkai Hei 8-178055 published by the Japanese Patent Office in 1996.

According to this invention, in this CVT, the speed change may be easily changed over manually by a simple operation.

The selector lever 105 has a manual operation position in which the selector lever 105 may be moved in a forward/backward or a left/right direction. In this manual operation position, for example, the selector lever 105 is elastically held in a neutral state, and is displaced in either a shift-up or shift-down direction when moved by the driver. This operating direction is detected by a switch S9 which inputs an operating direction signal to the electronic control unit 101. Based on this signal, as described above, the electronic control unit 101 then varies a speed change ratio by outputting a drive signal to the step motor 113.

Figure 3:
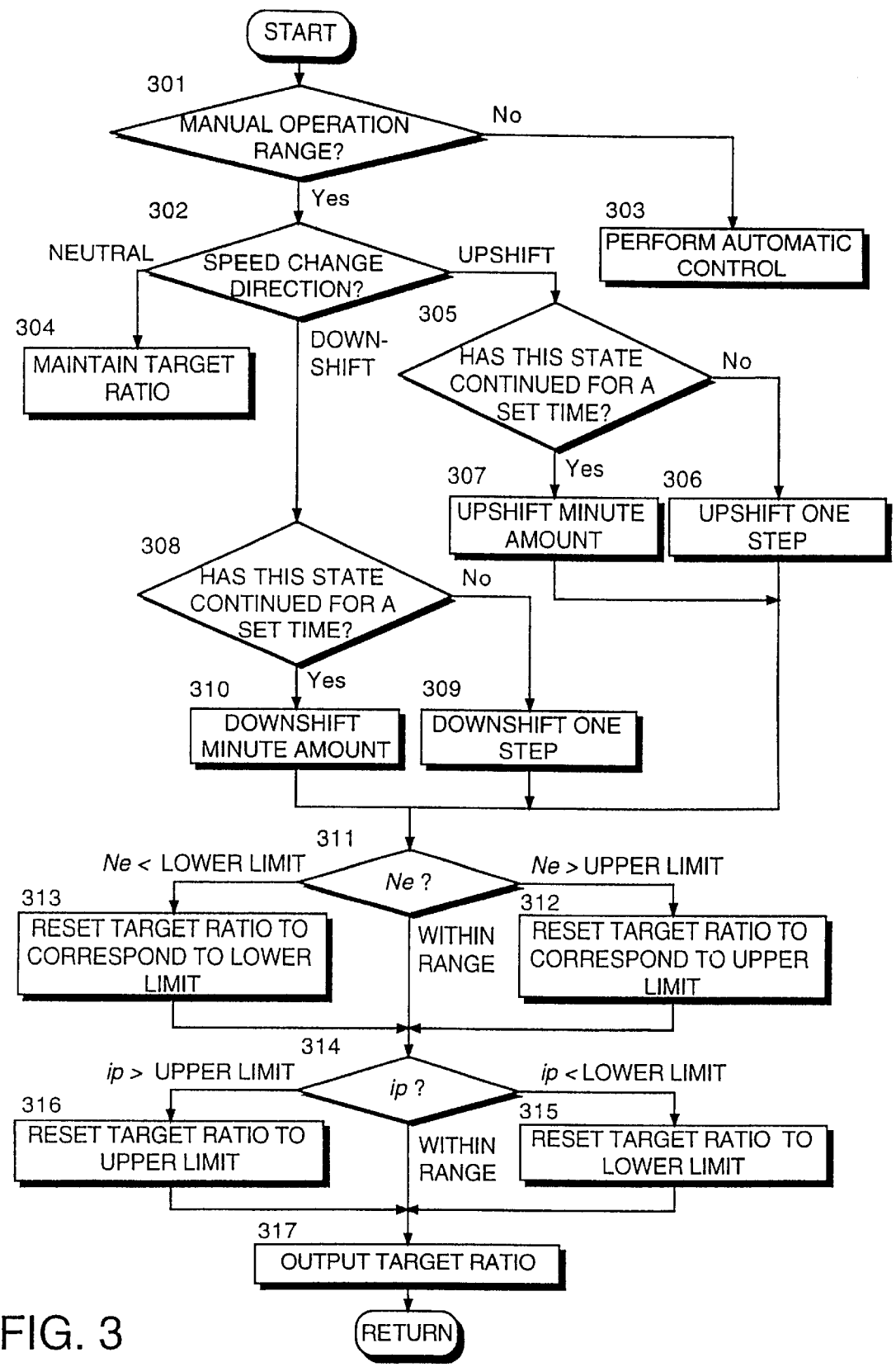
FIG. 3 is a flowchart describing a control process of the controller in a manual mode.

This control process will be described with reference to the flowchart of FIG. 3.

First in a step 301, it is determined, based on a signal from the inhibitor switch S6, it is determined whether the selector lever 105 is in the automatic speed change position wherein the speed change ratio is automatically controlled, or in the manual speed change position wherein the speed change is manually controlled. When it is in the automatic speed change position, the routine proceeds to a step 303, and the conventional automatic speed change control is performed which determines the speed change ratio based on the vehicle running conditions as described above.

Conversely in the manual speed change range, in a step 302, based on a signal from the operating direction switch S9, the displacement direction of the selector lever 105 in the manual operation position, i.e. the speed change direction desired by the driver, is determined.

When the selector lever 105 is in the neutral position of the manual operation position, the routine proceeds to a step 304, and the target speed change ratio so far applied is maintained.

When the selector lever 105 is moved in the shift-up direction, it is determined in a step 305 whether or not this state has continued for a predetermined time. When for example, the driver moves the selector lever 105 in the shift-up direction and then immediately returns it to the neutral position, the signal from the operating direction switch S9 also immediately changes from a signal showing shift-up to a signal showing neutral. The electronic control unit 101 detects this state by comparing the continuation time of the operating direction signal with a predetermined value, and when the continuation of the shift-up signal is less than a predetermined time, the target speed change ratio is varied in the shift-up direction in only one step in a step 306. Herein shift-up signifies a decrease of the target speed change ratio, and shift-down signifies an increase of the target speed change ratio.

When the driver continues moving the selector lever 105 in the shift-up direction, a shift-up signal continues for the predetermined time or longer. In this case, the routine proceeds to a step 307, and the target speed change ratio is decreased by a minute amount. Hence, when the selector lever 105 is continually moved in the shift-up direction, the target speed change ratio continually decreases.

In the step 302, when the selector lever 105 is moved in the shift-down direction, the time for which this operation continues is determined in the step 308. When this time is less than the predetermined time, i.e. when the driver moves the selector lever 105 in the shift-down direction and then immediately returns it to the neutral position, the target speed change ratio is varied in the shift-down direction in only one step in a step 309. When the shift-down operation is continued for the predetermined time or longer, the target speed change ratio is increased by a minute amount in a step 310. Hence, when the selector lever 105 is continually moved in the shift-down direction, the target speed change ratio continually increases.

In this manner, once the target speed change ratio has been set, it is determined whether or not the set target speed change ratio exceeds a limiting value.

In a step 311, it is first determined whether or not the engine rotation speed Ne when the set target speed change ratio is reached, has either increased beyond the maximum permitted value or fallen to less than the minimum permitted value.

When the engine rotation speed corresponding to the set target speed change ratio exceeds the maximum permitted value, the target speed change ratio is reset to a speed change ratio corresponding to this maximum permitted value in a step 312. Likewise, when the engine rotation speed Ne corresponding to the target speed change ratio falls below the minimum permitted value, the target speed change ratio is reset to a speed change ratio corresponding to this minimum permitted value in a step 313.

Next, in a step 314, it is determined whether or not this target speed change ratio ip exceeds the maximum speed change ratio or is less than the minimum speed change ratio of the continuously variable transmission. When the target speed change ratio ip is less than the minimum speed change ratio, the target speed change ratio ip is reset to the minimum speed change ratio in a step 315, conversely when the target speed change ratio ip exceeds the maximum speed change ratio, the target speed change ratio ip is reset to the maximum speed change ratio in a step 316.

When the target speed change ratios set in the steps 306–310 are within a permitted tolerance range for these engine rotation speeds and speed change ratios, the target speed change ratios are not reset.

A drive signal corresponding to the target speed change ratio thus determined is then output to the step motor 113 in a step 317, and the speed change ratio of the CVT 17 is controlled to the target speed change ratio.

Figure 4:
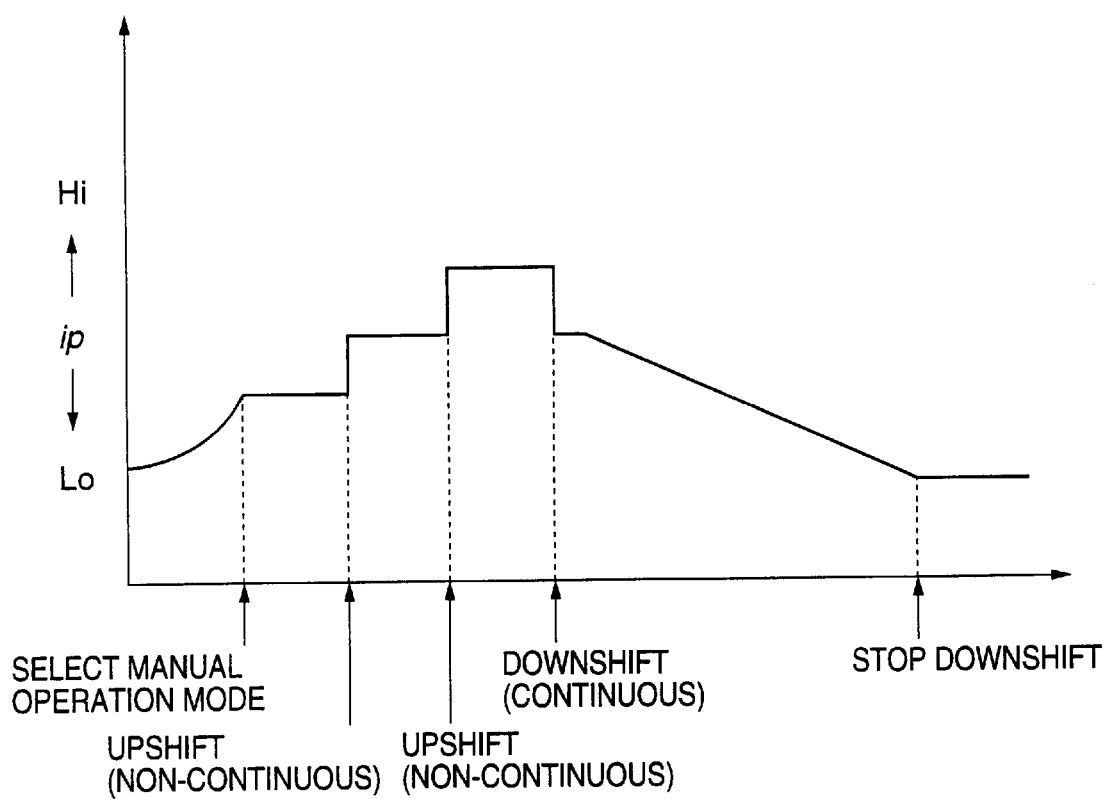
FIG. 4 is a timing chart showing speed change control results according to the control process.

FIG. 4 shows a modification of speed change ratio ip according to the aforesaid control process. In this modification, after first moving the selector lever 105 to the manual speed change position, the selector lever 105 is moved twice in the shift-up direction, moved in the shift-down direction for a predetermined time or longer, and then returned to the neutral position.

As seen from the figure, each time the selector lever 105 is moved in the manual operation position, the speed change ratio ip immediately varies by a predetermined step amount in the direction shown, and when the selector lever 105 is continually held in the either shift-up or shift-down position, the speed change ratio ip gradually varies in the direction shown. The speed change ratio ip desired by the driver is thus easily obtained by operating the selector lever 105 in the shift-up direction or shift-down direction in the manual operation position.

In fluid transmissions such as torque converters fitted with this type of continuously variable transmission, excepting when the vehicle is at rest or starting, the input/output shafts are normally directly connected. Excepting when the vehicle is at rest or starting, therefore, the rotation speed input to the CVT 17 corresponds to the engine rotation speed, and if the speed change ratio of the CVT 17 is determined at a certain travel speed, the engine rotation speed is also determined. Consequently in this case, the engine rotation speed may be used as a target control amount instead of the speed change ratio.

The above is an embodiment wherein the invention is applied to a belt-type continuously variable transmission, however this invention may also be applied to other types of continuously variable transmission such as a toroidal transmission.

The embodiments of this invention in which an exclusive property or privilege is claimed are defined as follows:

1. A speed change controller for an automatic transmission which engages the rotation speed of an output shaft of an automobile engine in a stepless manner, comprising:
   means for detecting a running condition of said automobile,
   means for setting a target speed change ratio of said transmission based on said running condition,
   means for changing a speed change ratio of said transmission to said target speed change ratio,
   means for manually inputting a command for modifying said target speed change ratio, and
   means for continually modifying said target speed change ratio at a predetermined rate while said command is continually input.

2. A speed change controller for an automatic transmission which engages the rotation speed of an output shaft of an automobile engine in a stepless manner, comprising:
   means for detecting a running condition of said automobile;
   means for setting a target speed change ratio of said transmission based on said running condition;
   means for changing a speed change ratio of said transmission to said target speed change ratio;
   means for manually inputting a command for modifying said target speed change ratio; and
   means for modifying said target speed change ratio at a predetermined rate while said command is input,
   wherein said modifying means comprises first means for modifying said target speed change ratio by a predetermined correction rate when said command is input, and a second means for modifying said target speed change ratio at a predetermined rate while said command is continually input longer than a predetermined time.

3. A speed change controller as defined in claim 1, wherein said target speed change ratio is set so that a rotation speed of the engine is equal to a preset target engine rotation speed.

4. A speed change controller as defined in claim 1, wherein said target speed change ratio is set based on an engine load and travel speed of the automobile.

5. A speed change controller as defined in claim 1, wherein said modifying means comprises means for limiting said target speed change ratio after correction within a predetermined range.

6. A speed change controller as defined in claim 1, wherein said modifying means comprises means for limiting said target speed change ratio after correction so that a rotation speed of the engine remains within a predetermined range.

7. A speed change controller for an automatic transmission which changes the rotation speed of an output shaft of an automobile engine in a stepless manner, comprising:
   a sensor for detecting a running condition of the automobile;
   a switch for manually inputting a command for modifying a target speed change ratio of the transmission; and
   a microprocessor programmed to
     set a target speed change ratio of the transmission based on the running condition;
     change the speed change ratio of the transmission to the target speed change ratio; and
     continually modify the target speed change ratio at a predetermined rate while the command is continually input.

8. A method of speed change control for an automatic transmission of an automobile, comprising:
   detecting a running condition of the automobile;
   setting a target speed change ratio of the transmission based on the running condition;
   changing a speed change ratio of the transmission to the target speed change ratio;
   manually inputting a command for modifying the target speed change ratio; and
   continually modifying the target speed change ratio at a predetermined rate while the command is continually input.

9. A method of speed change control as claimed in claim 8, further comprising:
   modifying the target speed change ratio at a predetermined rate when the command is input; and
   modifying the target speed change ratio at another predetermined rate when the command is continually input longer than a predetermined time.

10. A method of speed change control as claimed in claim 8, further comprising:
    setting the target speed change ratio so that the rotation speed of the engine is equal to a preset target engine rotation speed.

11. A method of speed change control as claimed in claim 8, further comprising:

setting the target speed change ratio based on an engine load and travel speed of the automobile.

12. A method of speed change control as claimed in claim 8, further comprising:

limiting the target speed change ratio after correction within a predetermined range.

13. A method of speed change control as claimed in claim 8, further comprising:

limiting the target speed change ratio after correction so that a rotation speed of the engine remains within the predetermined range.

* * * * *